US011927712B2

(12) United States Patent
Weng et al.

(10) Patent No.: US 11,927,712 B2
(45) Date of Patent: Mar. 12, 2024

(54) DOWNHOLE ULTRASOUND IMAGE CORRECTION IN OIL BASED MUD

(71) Applicant: Halliburton Energy Services, Inc., Houston, TX (US)

(72) Inventors: Yu Weng, Kingwood, TX (US); Peng Li, Houston, TX (US); Chung Chang, Houston, TX (US); Richard Coates, Katy, TX (US); Rodney Allen Marlow, Spring, TX (US); Xiang Wu, Singapore (SG); Yao Ge, Singapore (SG); Jing Jin, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/745,599

(22) Filed: May 16, 2022

(65) Prior Publication Data
US 2022/0276403 A1  Sep. 1, 2022

Related U.S. Application Data

(62) Division of application No. 16/449,097, filed on Jun. 21, 2019, now Pat. No. 11,415,720.
(Continued)

(51) Int. Cl.
*G01V 1/50* (2006.01)
*E21B 47/002* (2012.01)
(Continued)

(52) U.S. Cl.
CPC ............ *G01V 1/50* (2013.01); *E21B 47/0025* (2020.05); *E21B 47/02* (2013.01); *G01V 1/305* (2013.01);
(Continued)

(58) Field of Classification Search
CPC .. G01V 1/50; G01V 2210/54; E21B 47/0025; E21B 47/02
See application file for complete search history.

(56) References Cited

U.S. PATENT DOCUMENTS 9,658,360 B2   5/2017 Hollmann et al.
11,578,591 B2*  2/2023 Manders .................. G01V 1/48
(Continued)

FOREIGN PATENT DOCUMENTS

CN          106837299           6/2017

OTHER PUBLICATIONS

Halliburton, Well Assurance, Circumferential Acoustic Scanning Tool-InSite (CAST-I) Service, H012324, Aug. 2016.
(Continued)

*Primary Examiner* — Hovhannes Baghdasaryan
(74) *Attorney, Agent, or Firm* — Benjamin Ford; C. Tumey Law Group PLLC

(57) ABSTRACT

Disclosed herein is a method for eccentricity correction. This method may dispose a downhole tool into a borehole. The downhole tool may comprise a measuring assembly that has at least one transducer, determining a beam pattern from the at least one transducer, determining a center of the measurement assembly in the borehole with the beam pattern, calculating a beam pattern factor with at least the beam pattern, calculating an angle factor with at least the beam pattern, calculating an eccentricity factor with at least the beam pattern factor and the angle factor, and creating an eccentricity corrected image with at least the eccentricity factor.

20 Claims, 12 Drawing Sheets

Related U.S. Application Data

(60) Provisional application No. 62/746,393, filed on Oct. 16, 2018.

(51) Int. Cl.
　　*E21B 47/02*　　(2006.01)
　　*G01V 1/30*　　(2006.01)
　　*E21B 47/085*　　(2012.01)
　　*G01V 1/52*　　(2006.01)

(52) U.S. Cl.
　　CPC ............ *G01V 1/307* (2013.01); *E21B 47/085* (2020.05); *G01V 1/306* (2013.01); *G01V 1/52* (2013.01); *G01V 2001/526* (2013.01); *G01V 2210/54* (2013.01); *G01V 2210/6222* (2013.01); *G01V 2210/6226* (2013.01)

(56) References Cited

U.S. PATENT DOCUMENTS

| | | |
|---|---|---|
| 2009/0222209 A1 | 9/2009 | Morys |
| 2016/0109605 A1 | 4/2016 | Bose et al. |
| 2016/0109606 A1 | 4/2016 | Market et al. |
| 2017/0045640 A1* | 2/2017 | Zhang .................. G01V 5/12 |
| 2017/0115423 A1 | 4/2017 | Hori et al. |
| 2017/0082767 A1 | 5/2017 | Jesus et al. |
| 2017/0212263 A1 | 7/2017 | Zhang et al. |
| 2017/0212274 A1 | 7/2017 | Sun et al. |
| 2018/0005360 A1 | 1/2018 | Probel et al. |
| 2018/0252837 A1 | 9/2018 | Tang et al. |
| 2019/0339411 A1 | 11/2019 | Dollfus et al. |

OTHER PUBLICATIONS

International Search Report for Application No. PCT/US2019/038597, dated Oct. 23, 2019.

Office Action Summary for U.S. Appl. No. 16/449,097 dated Sep. 23, 2021.

Final Office Action Summary for U.S. Appl. No. 16/449,097 dated Feb. 4, 2022.

Notice of Allowance for U.S. Appl. No. 16/449,097 dated Apr. 13, 2022.

\* cited by examiner

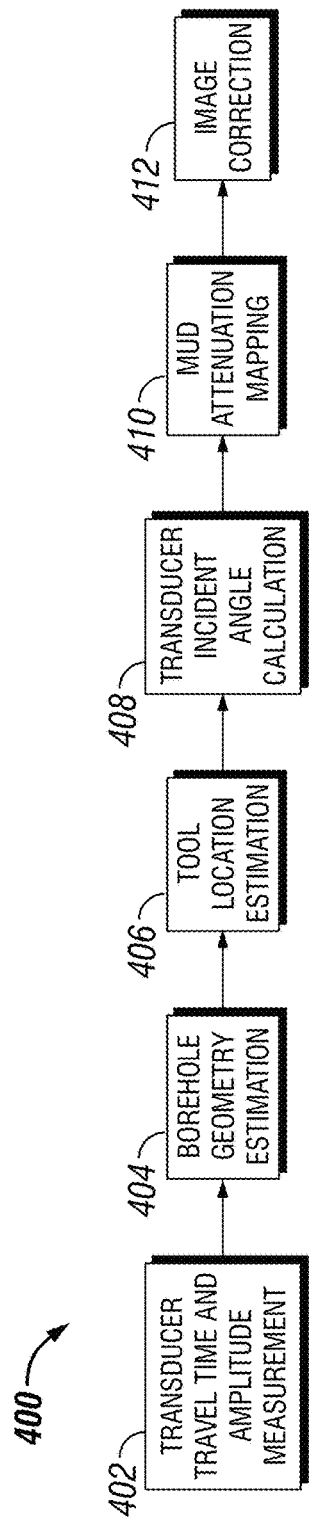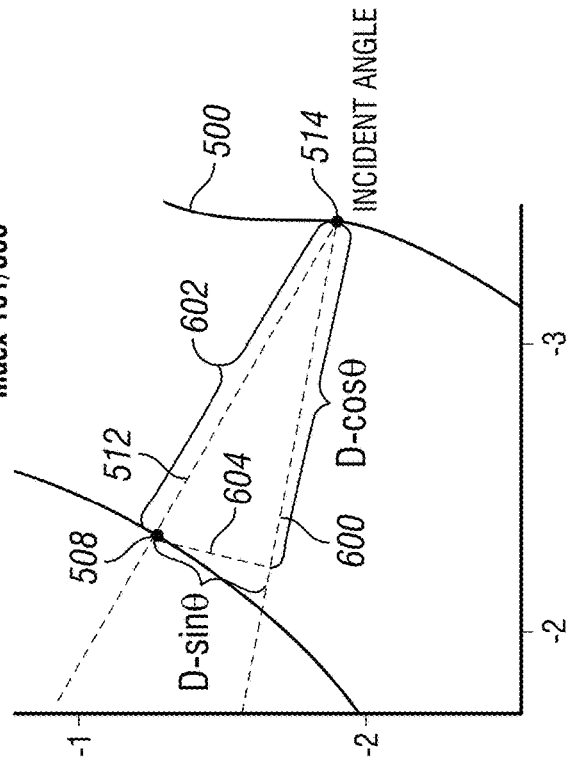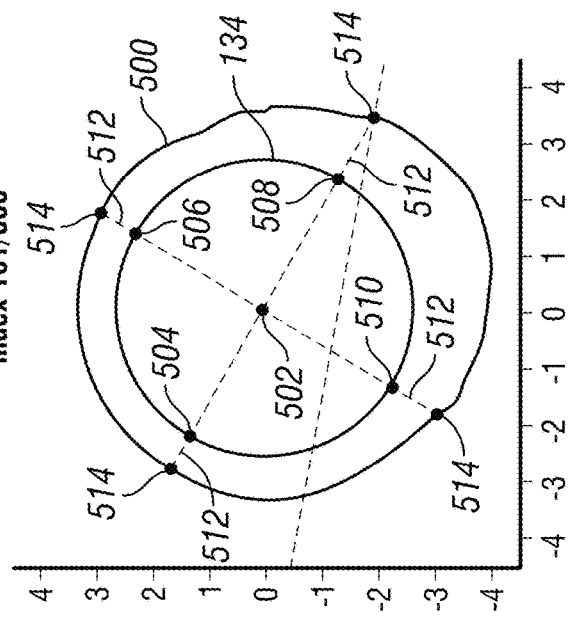
FIG. 4
FIG. 6
FIG. 5

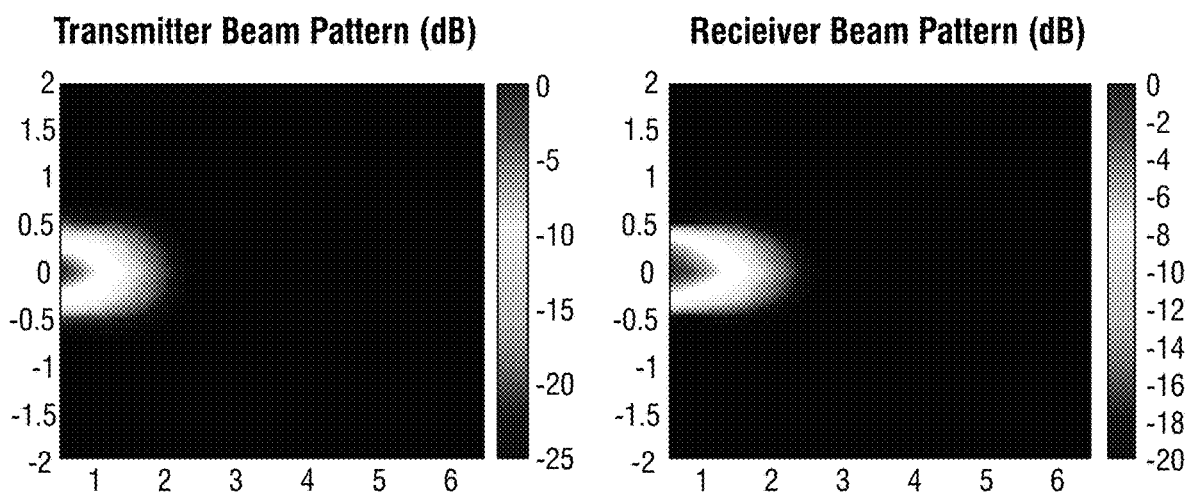
FIG. 7          FIG. 8
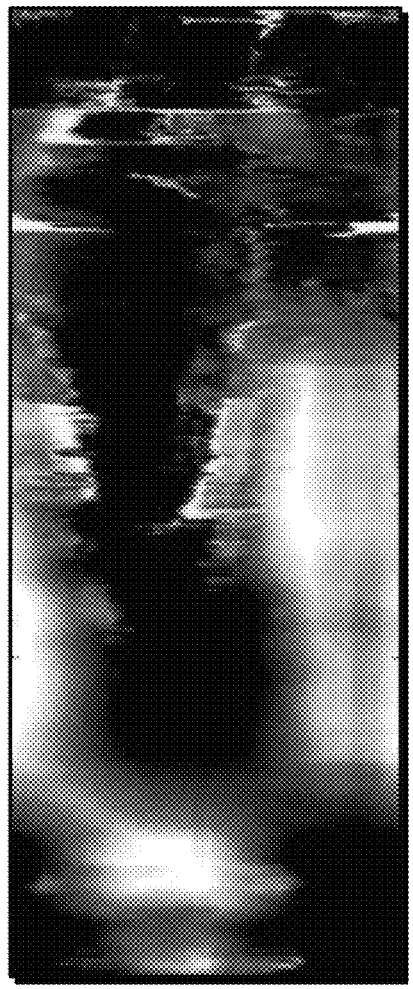 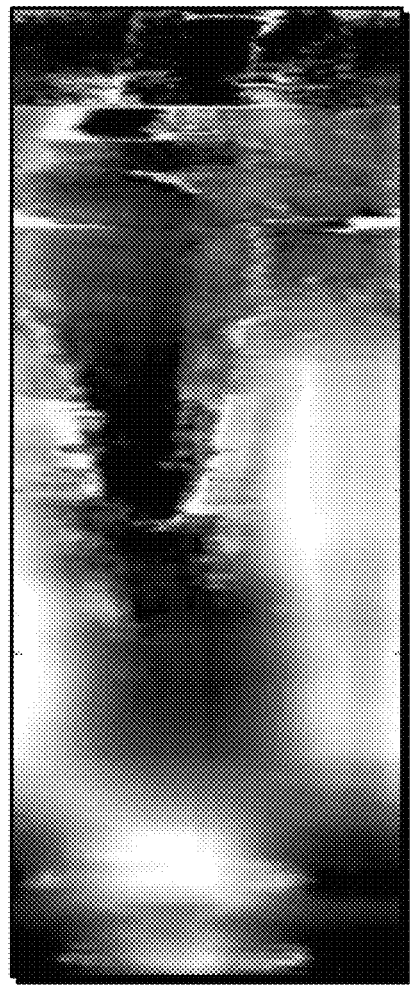
FIG. 9          FIG. 10

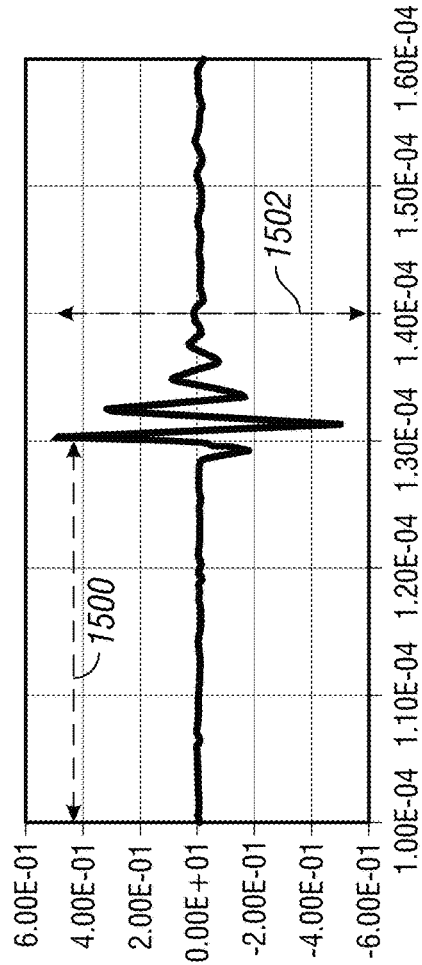
FIG. 15
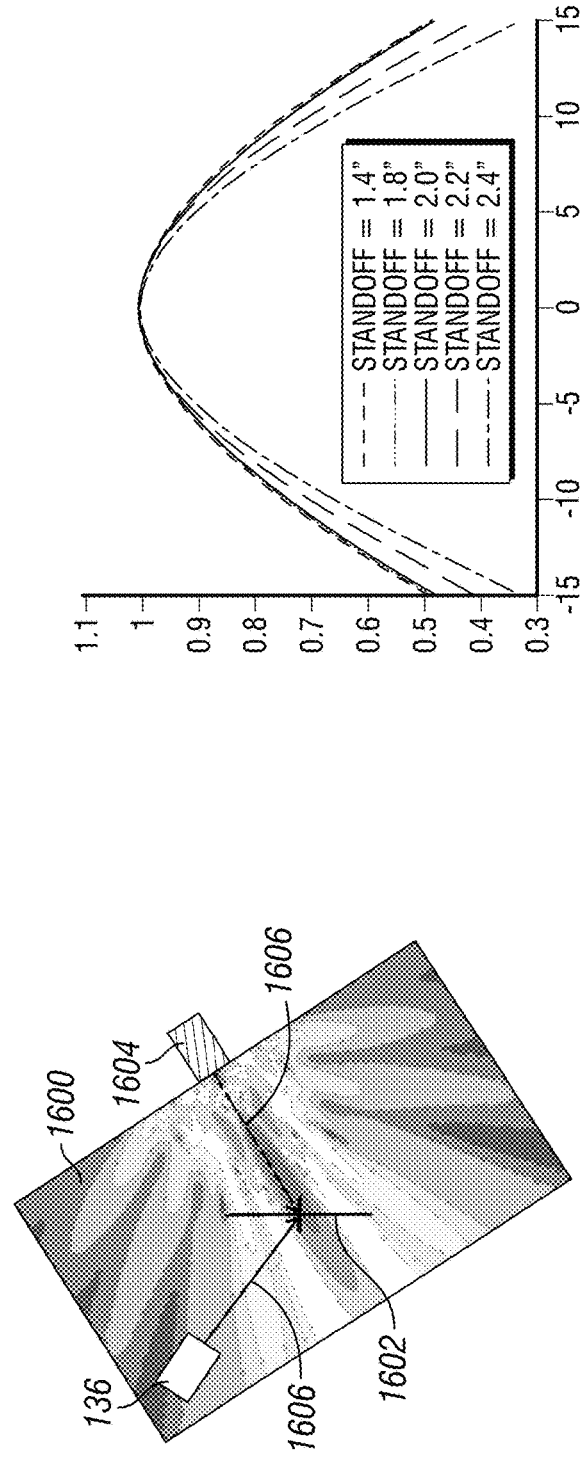
FIG. 16
FIG. 17

DOWNHOLE ULTRASOUND IMAGE CORRECTION IN OIL BASED MUD

BACKGROUND

Wellbores drilled into subterranean formations may enable recovery of desirable fluids (e.g., hydrocarbons) using any number of different techniques. Currently, drilling operations may identify subterranean formations through a bottom hole assembly in vertical and/or horizontal wellbores. Additionally, properties of subterranean formations, borehole, wellbore, and/or the like may also be identified using any suitable technique. One technique for identifying properties of a subterranean formations, borehole, wellbore, and/or the like may be performed using ultrasonic operations. The ability to produce high resolution images in oil-based mud may be beneficial in determining properties of a subterranean formations, borehole, wellbore, and/or the like. Ultrasonic imaging in oil-based mud may be challenging because ultrasonic waves are highly attenuative in mud. In addition, tool eccentricity, tool position, and the irregular shape of the borehole make it even harder to provide a high-quality image. This may prevent an operator from determining properties of a subterranean formations, borehole, wellbore, and/or the like in oil-based mud using ultrasonic imaging.

BRIEF DESCRIPTION OF THE DRAWINGS

These drawings illustrate certain aspects of some examples of the present disclosure, and should not be used to limit or define the disclosure.

FIG. 4 is a workflow for attenuation correction;

FIG. 5 illustrates a cross-section of a measurement assembly disposed in a borehole;

FIG. 6 illustrates various incidence angles and distances between the measurement assembly and the borehole;

FIG. 7 illustrates a transmitter beam pattern;

FIG. 8 illustrates a receiver beam pattern;

FIG. 9 illustrates an attenuation coefficient map of four transducer using the transmitter beam pattern;

FIG. 10 illustrates an attenuation coefficient map of four transducer using the receiver beam pattern;

FIG. 15 is a graph of a pulse-echo signal recorded by a transducer;

FIG. 16 is a schematic of a transceiver, a reflecting surface, an image transceiver, and a beam pattern;

FIG. 17 is a graph of a calculated beam pattern factor;

DETAILED DESCRIPTION

Systems and methods described below may disclose an effective amplitude compensation method, which enhance the ultrasound impedance imaging result as well as allow a user to correctly stack images generated by multiple tool rotations. Systems and methods may identify the uneven mud attenuations due to tool position, transducer illumination angle and borehole irregularities; determine the proper compensation factors, and apply them to get the corrected borehole image. Proposed methods may compensate for the amplitude intensity for variations in attenuation caused by tool position and borehole irregularity. This results in a quantitatively accurate impedance map, not just a qualitative color display. Thus, in addition to revealing borehole features that would otherwise not be distinguishable, the impedance map may be combined with density information from other tools to provide a high-resolution estimate of sonic velocity and other rock mechanical properties where traditional sonic data is not available.

Additionally, methods and systems may correct ultrasonic borehole images due to eccentricity and attenuation that may be found in logging operations. Eccentricity correction may account for the amplitude variation due to beam pattern and incident angle. Attenuation correction may account for acoustic attenuation in viscous mud. Methods for correction to eccentricity and attenuation may utilize various factors such as beam pattern defect, angular effect, borehole fluid attention, and/or the like. Additionally, workflows may use the various factors to improve results of ultrasonic imaging during logging operations. It should further be noted that all systems and methods described below may be performed in a wellbore or borehole and may operate and function in both oil-based mud and water-based mud.

Figure 1:
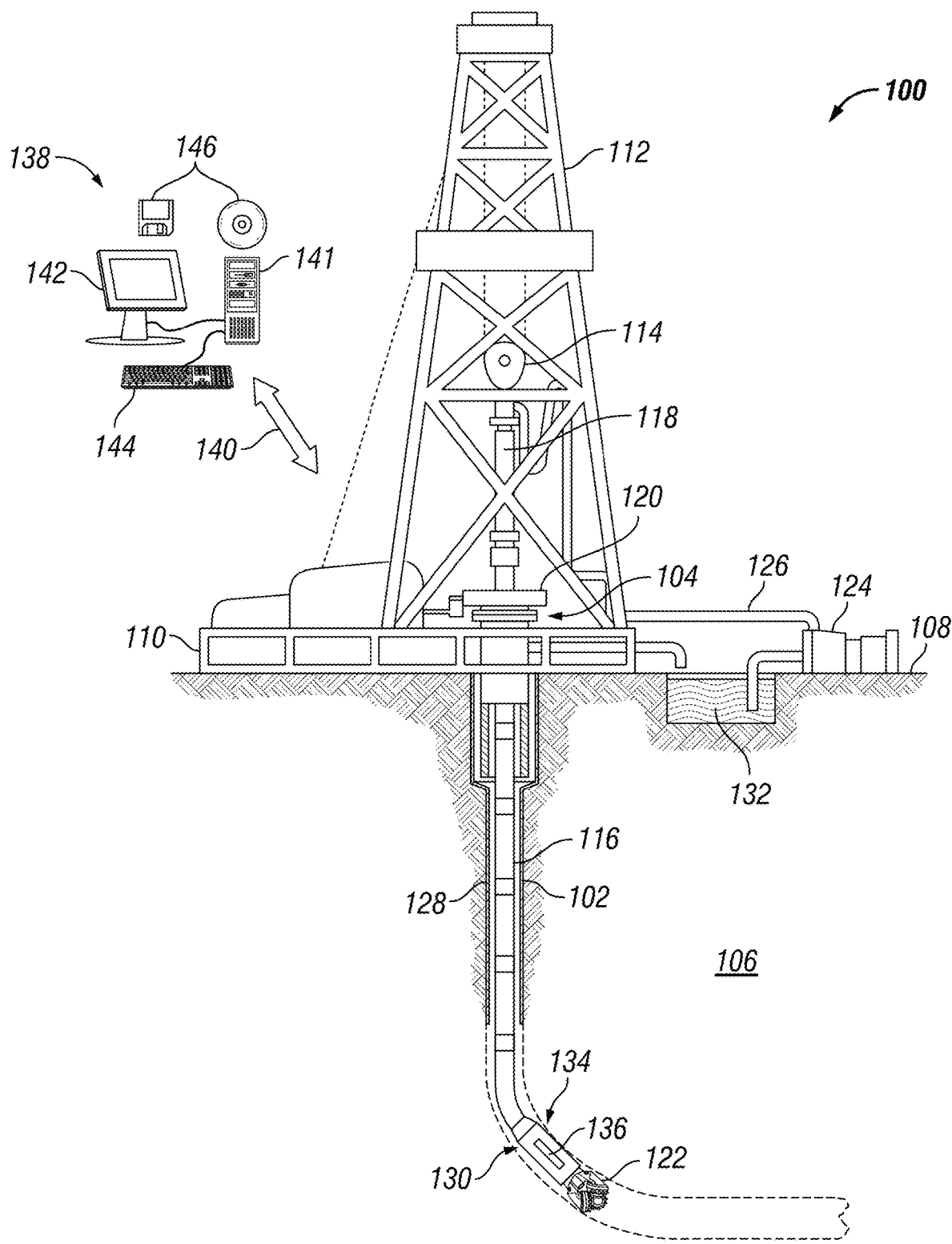
FIG. 1 illustrates an example of a drilling system.

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG.

1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly 130 at distal end of drill string 116. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Bottom hole assembly 130 may include any number of tools, transmitters, and/or receivers to perform downhole measurement operations. For example, as illustrated in FIG. 1, bottom hole assembly 130 may include a measurement assembly 134. It should be noted that measurement assembly 134 may make up at least a part of bottom hole assembly 130. Without limitation, any number of different measurement assemblies, communication assemblies, battery assemblies, and/or the like may form bottom hole assembly 130 with measurement assembly 134. Additionally, measurement assembly 134 may form bottom hole assembly 130 itself. In examples, measurement assembly 134 may include at least one transducer 136, which may be disposed at the surface of measurement assembly 134. It should be noted that transducer 136 may also be referred to as a transducer. Without limitation, transducer 136 may also be disposed within measurement assembly 134 and there may be four transducers 136 that may be disposed ninety degrees from each other. However, it should be noted that there may be any number of transducers 136 disposed along bottom hole assembly 130 at any degree from each other. Transducers 136 may function and operate to generate an acoustic pressure pulse that travels through borehole fluids. In examples, transducers 136 may further sense and acquire the reflected pressure wave which is modulated (i.e., reflected as an echo) by the borehole wall. During measurement operations, the travel time of the pulse wave from transmission to recording of the echo may be recorded. This information may lead to determining a radius of the borehole, which may be derived by the fluid sound speed. By analyzing the amplitude of the echo signal, the acoustic impedance may also be derived. Without limitation, transducers 136 may be made of piezo-ceramic crystals, or optionally magnetostrictive materials or other materials that generate an acoustic pulse when activated electrically or otherwise. In examples, transducers 136 may also include backing materials and matching layers. It should be noted that transducers 136 and assemblies housing transducers 136 may be removable and replaceable, for example, in the event of damage or failure.

Without limitation, bottom hole assembly 130 may be connected to and/or controlled by information handling system 138, which may be disposed on surface 108. Without limitation, information handling system 138 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from bottom hole assembly 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that may store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into, one, two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from bottom hole assembly 130 of the formation properties may be used to steer drilling system 100 toward a subterranean formation 106. Optionally, these measurements may be used to plan well completion operations, including but not limited to placement of packers, hydraulic fracturing, cementing, acidizing or the placement of mud-loss mitigation treatments. Optionally, these measurements may be used for reservoir or over-burden characterization purposes.

Figure 2:
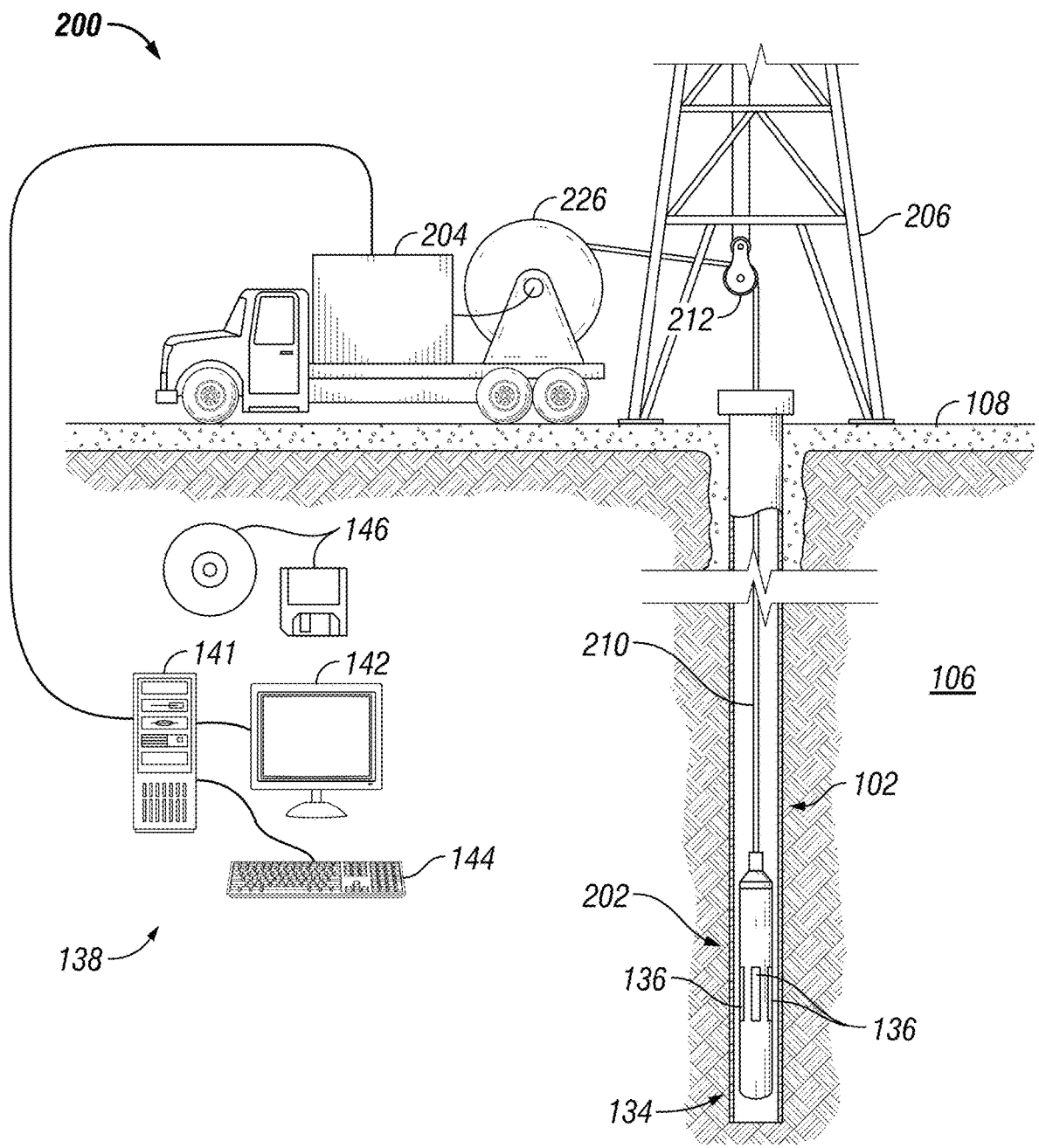
FIG. 2 illustrates an example of a well measurement system.

FIG. 2 illustrates a cross-sectional view of a well measurement system 200. As illustrated, well measurement system 200 may include downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may include, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may include an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored on memory and then processed by downhole tool 202. The processing may be performed real-time during data acquisition or after recovery of downhole tool 202. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from wellbore 102. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, one can produce images of geological structures from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown), which may determine the amount of pull on conveyance 210 at the surface of wellbore 102. Information handling system 138 may include a safety valve (not illustrated), which controls the hydraulic pressure that drives drum 226 on vehicle 204, which may reel up and/or release conveyance 210, which may move downhole tool 202 up and/or down wellbore 102. The safety valve may be adjusted to a pressure such that drum 226 may only impart a small amount of tension to conveyance 210 over and above the tension necessary to retrieve conveyance 210 and/or downhole tool 202 from wellbore 102. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may include at least one transducer 136, which may be disposed at the surface of measurement assembly 134. Without limitation, transducer 136 may also be disposed within measurement assembly 134. Without limitation, there may be four transducers 136 that may be disposed ninety degrees from each other. However, it should be noted that there may be any number of transducers 136 disposed along bottom hole assembly 130 at any degree from each other. Transducers 136 may function and operate to generate and receive acoustic pulses in the borehole fluid.

Figure 3:
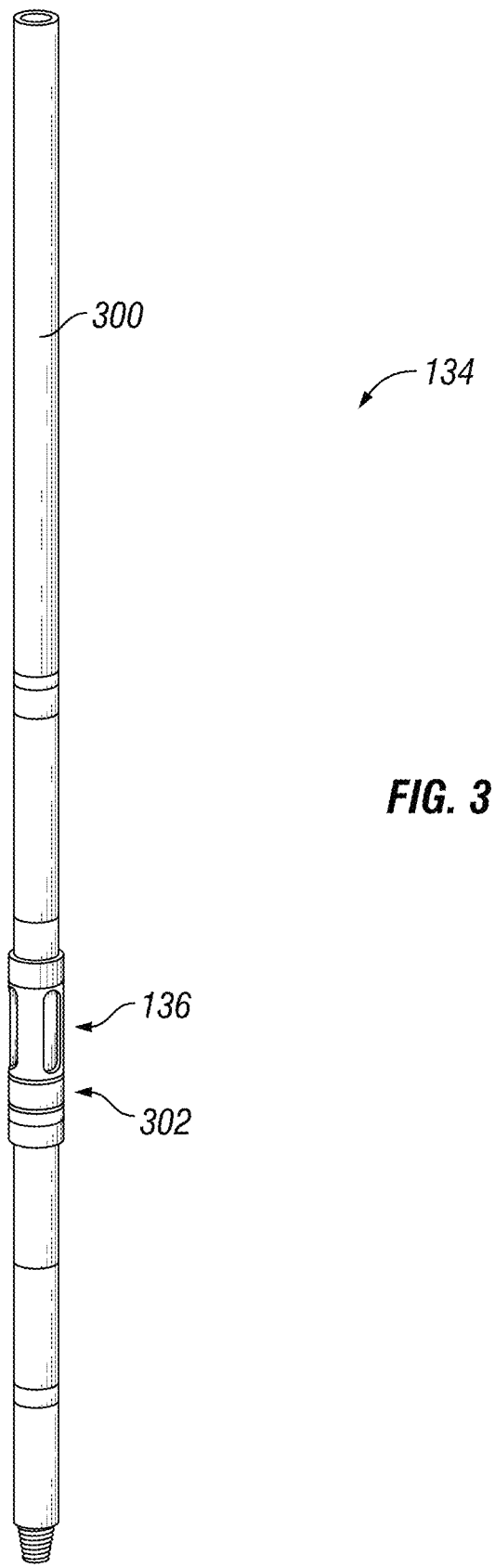
FIG. 3 illustrates an example of a measurement assembly.

FIG. 3 illustrates a close-up view of measurement assembly 134. As illustrated, measurement assembly 134 may include at least one battery section 300 and at least one instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136, which may be disposed at any end of battery section 300 in instrument section 302. Without limitation, battery section 300 may not be utilized within measurement assembly. In such examples measurement assembly 134 may draw power from other sources within bottom hole assembly 130 (e.g., referring to FIG. 1) such as a mud-turbine.

Instrument section 302 may house at least one transducer 136 and/or a measure point 304. As describe above, transducer 136 may function and operate to emit an acoustic, which is specifically an ultrasonic pressure pulse that travels through borehole fluids. The pressure pulse may have a frequency range from 200 kHz-300 kHz, centered near 250 kHz. It should be noted that the pulse signal may be emitted with different frequency content. Transducers 136 may be referred to as a "pinger" and/or transceiver and may measure and/or record echoes. Recordings and/or measurements taken by transducer 136 may be transmitted to information handling system 138 by any suitable means, as discussed above.

As disclosed below, measurement assembly 134 and information handling system 138 may improve borehole imaging via geometrical and attenuation corrections. FIG. 4 illustrates a flowchart 400 for improving a borehole image. Flowchart 400 may begin with step 402. In step 402, a transducer travel time and amplitude measurement may be made by measurement assembly 134, specifically utilizing transducer 136. FIG. 15 is a graph of a typical response from a transducer 136 (e.g., referring to FIG. 1) sampled at a given azimuthal and depth location, with the ringdown signal of transducer 136 removed. Travel time 1500 and echo amplitude 1502 may be calculated using various algorithms. As shown, echo amplitude 1502 in FIG. 15 is measured by the peak-to-peak amplitude, while deconvolution and cross-correlation may be alternative ways to represent amplitude. Without limitation, with signals collected at different azimuthal and depth locations by measurement assembly 134 (e.g., referring to FIG. 3), the recorded echo amplitude 1502 or the travel time 1500 may be plotted to form a 2D image. However, due to the typical size of the features on the borehole wall (e.g., minor cracks and faults) and that of the wavelength of the signal emitted from transducer 136, diffractions may dominate the received waveforms. Therefore, the amplitude image shows higher resolution than a caliper image and it is thus more sensitive to borehole features. However, as described above, several other factors affect the echo amplitude 1502 such as standoff, angle of incident and mud attenuation. During LWD operations in which measurement assembly 134 is often off-centered and moving, the obtained image has poor quality due to uneven standoff.

Correcting an ultrasonic image may be performed by dividing the amplitude pixel at each azimuthal and depth location by their respective correction factor. A correction factor may include two parts, one or more tool-eccentricity related factors and one or more medium attenuation factors. Tool-eccentricity related factors are formed from a transmission of a beam pattern from measurement assembly 134 and an angular response of transducer 136 (e.g., referring to FIG. 1). The attenuation factor is due to the viscosity of the medium (borehole fluid), where the acoustic energy is dissipated.

The dissipation of the acoustic energy of a borehole fluid may be characterized by its Q value. A low Q value indicates a highly viscous fluid (such as heavy oil-based mud) in which acoustic wave decays quickly as it propagates. Water may be considered as a highly elastic fluid having a very high Q value.

The amplitude decays due to attenuation is frequency-dependent and may be expressed as:

$$A = A_o e^{-\frac{\pi f t}{Q}}, \quad (1)$$

where $A_o$ is the amplitude of wave packet without attenuation, t is the arrival time of the wave packet and f is the frequency of acoustic wave.
In examples, a value:

$$Q_d = Q\frac{v}{\pi} \quad (2)$$

is defined in which v is the group velocity of the fluid. Perfectly elastic water has Q value equal to infinity. Therefore, Equation (1) may be further derived as:

$$\ln\frac{A_{water}}{A_{mud}} = \frac{d}{Q_{d,mud}} \cdot f. \quad (3)$$

Equation (3) shows that amplitude is a function of two-way travel distance d, frequency f and mud property $Q_{d,\,mud}$. The equation may be used to convert echo amplitude in any type of mud into the amplitude in water.

Figure 24:
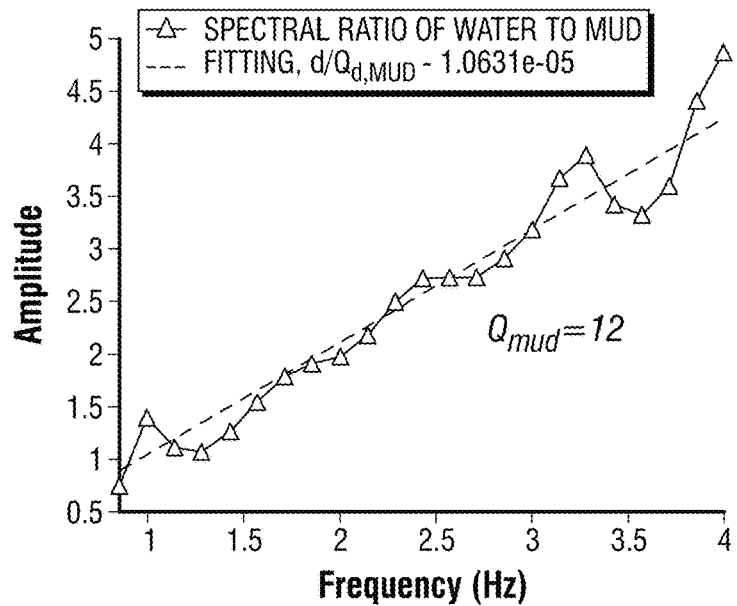
FIG. 24 is a graph of a $Q_{d,mud}$ value using spectral ration between signals received in water and mud.

Additionally, Equation (3) may be validated with experimental results. In FIG. 24, the $Q_{d,\,mud}$ value for a given type of mud may be calculated from the slope of the spectral ratio of water to mud versus frequency.

With continued reference to step 402, one or more transducers 136 may generate an ultrasonic pressure wave; a reflected waveform may be recorded and sampled; a center of echo signal may be detected to determine the travel time and associated amplitude at the center of the echo. In step 404, a borehole geometry estimation may be determined via the measurements found in step 402. Estimations of the borehole geometry in step 404 may be used in step 406 to estimate the location of measurement assembly 134 in the borehole.

The borehole shape estimation may be based on standard multiple point ultrasonic measurements at the same tool depth. Standard multiple point ultrasonic measurements may be performed by a system with multiple transducers. With a multiple transducer system, the location of the tool center with respect to the borehole geometry may be estimated. FIG. 5 illustrates the geometric shape of the example borehole 500 and the location of a center 502 of measurement assembly 134. Center 502 of measurement assembly 134 may not be centered in borehole 500. During measurement operations, the amplitude of ultrasonic image is attenuated caused by ultrasonic wave propagation in viscous borehole fluid (e.g. oil-based mud or water-based mud). The amplitude is a function of the propagation distance, frequency of signals, and the intrinsic attenuation characteristics of the borehole fluid. Without limitation, an angle of measurement assembly 134 in relation to example borehole 500 may be used to estimate the location of measurement assembly 134 in borehole 500 for step 406. For example, first transducer 504, second transducer 506, third transducer 508, and fourth transducer 510 may be disposed at any suitable location around measurement assembly 134. All four transducers emit incident waves along their respective directions 512 shown as dashed lines running radially outward from center 502. As illustrated, incident waves may strike a location 514 on example borehole 500, which may be in line with center 502 and at least one of transducers 504, 506, 508, or 510. The distance from location 514 to at least one of transducers 504, 506, 508, or 510 may be calculated.

From the estimated location in step 406 and the estimated borehole shape in 404, a transducer incident angle calculation may be performed in step 408. For example, as illustrated in FIG. 6, given location 514 and contour of borehole 500, a normal direction may be obtained if specular reflection is assumed at location 514. The incident angle θ between the incident ray 512 and normal direction 600 may be calculated. In addition, standoff 602 from transducer 508 (which may be any transducer 504, 506, 508, or 510) to location 514 may be calculated and its components along normal direction 600 and 604 may be calculated, respectively. Steps described previously may be repeatedly executed for each firing data, thus acquiring a map off incident angles and standoff compositions.

After determining the incident angle, the mud attenuation mapping, in step 410, may be performed utilizing the found incident angle and standoff compositions. Mud attenuation maps may be built by using recorded and measured beam patterns. FIGS. 7 and 8 show an example beam patterns of the ultrasonic transmitted from transducer 136 in mud in FIG. 7 and transducer 136 receiving the ultrasonic in the same medium in FIG. 8. The calculated attenuation maps of transducer 136 as a transmitter and transducer 136 as a receiver are shown in FIGS. 9 and 10, respectively. The x axis refers to an angle of measurement assembly 314 (e.g., referring to FIG. 5) and y axis refers to the depth.

Figure 11:
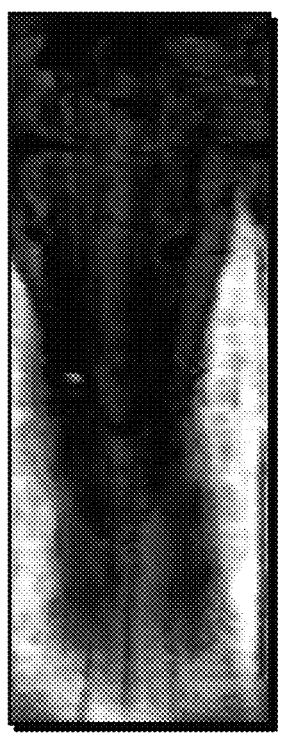
FIG. 11 illustrates an uncorrected borehole impedance image.
Figure 12:
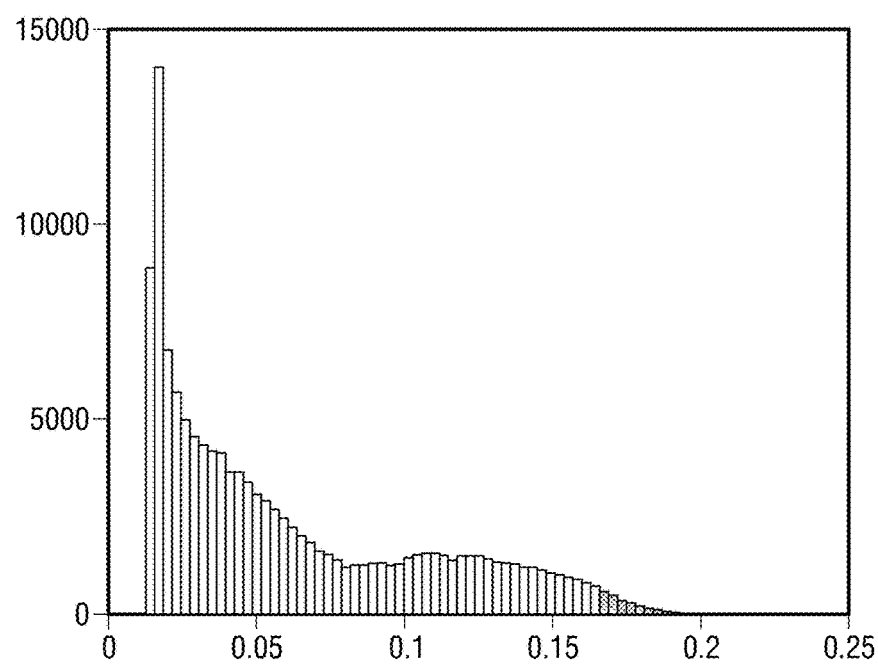
FIG. 12 is a histogram of an uncorrected amplitude distribution.
Figure 13:
FIG. 13 illustrates a corrected borehole impedance image.
Figure 14:
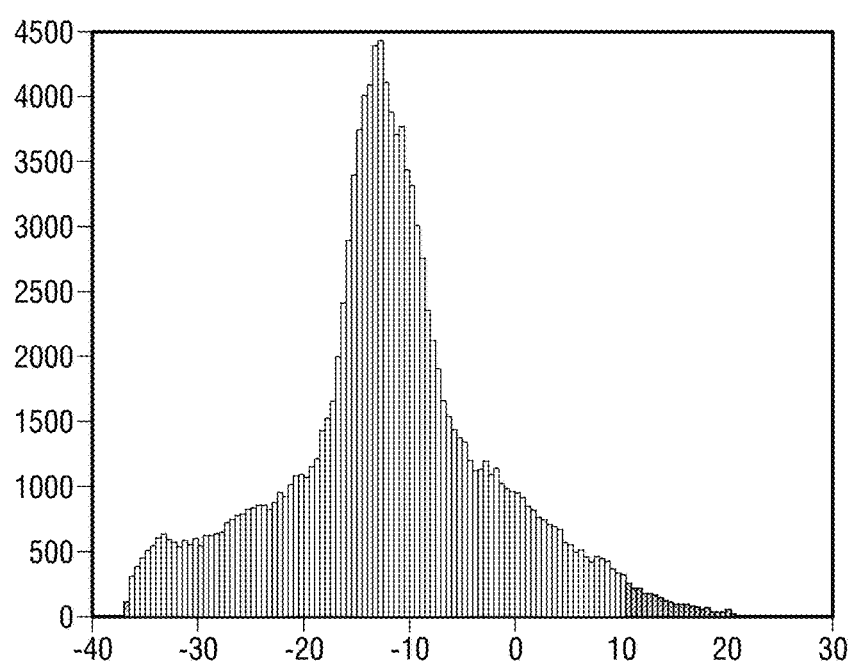
FIG. 14 is a histogram of a corrected amplitude distribution.

From mapping in step 410, the produced maps may be used in step 412 for image correction. An image correction may be found by compensating an amplitude by subtracting attenuation maps of the transmitter and receiver, subsequently, in the dB domain. Equivalently, the compensation may also be realized by division in a linear domain. FIGS. 11 and 13 show one section of the borehole images before and after attenuation correction, respectively. The histogram distribution in FIG. 12 and histogram in FIG. 14 are also shown for comparison between uncorrected and corrected images. As seen in FIGS. 11 and 13, features and details may be more readily visualized in the corrected image in FIG. 13 than the uncorrected image in FIG. 11. The distribution curves in the histograms of FIGS. 12 and 14 confirm the effectiveness of flowchart 400 (e.g., referring to FIG. 4) for image correction. Before correction, a decaying distribution matches the fact that mud attenuation dominates the image, however, tool eccentricity is presented. After correction, there is no more decaying feature in the histogram. The wings in the corrected distribution represents features, which are different from the rest part on the borehole impedance image.

In examples, mud attenuation mapping may be based on static pre-job physical measurement as illustrated above. However, it may also be estimated statistically using all transducer measurement within a certain period of time. Thus, the computed hitting point and its corresponding amplitude may be used to build a 2D amplitude histogram. Either statistical mean or median may be used to derive the estimated beam pattern in real-time.

Among the tool-eccentricity related factors, the transmitted beam pattern factor may be computed through the simulation using a transducer 136, or one or more experimental measurements. As shown in FIG. 16, wellbore 102 may be illustrated as a flat surface 1600 when the borehole diameter is much larger than the standoff. FIG. 16 illustrates transducer 136, reflecting surface 1602, image transceiver 1604 and beam pattern 1606. Received energy may be computed based on beam pattern 1606 of image transceiver 1604 at the location of transducer 136. FIG. 17 is a graph of the calculated beam pattern factor.

Figure 19:
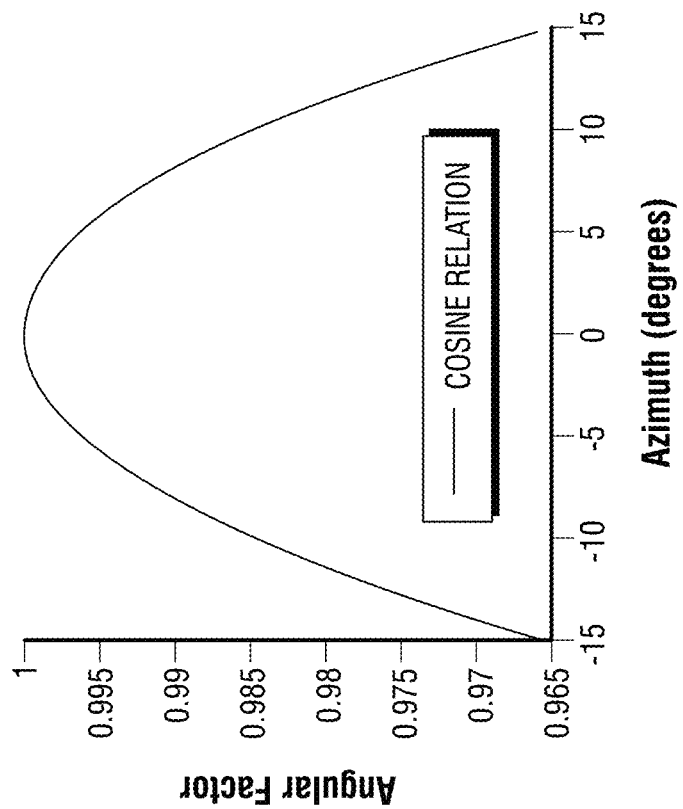
FIG. 19 is graph of a calculated angular factor.
Figure 18:
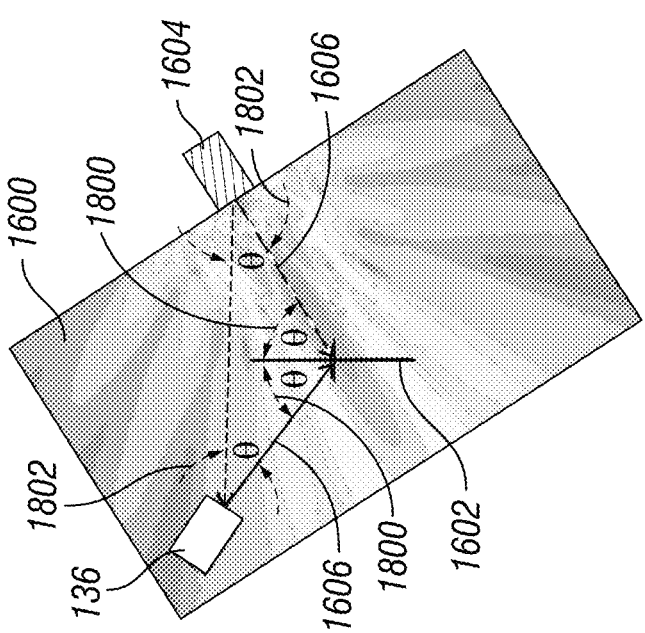
FIG. 18 is another schematic of a transceiver, a reflecting surface, an image transceiver, and a beam pattern.

FIG. 18 illustrates, transducer 136, reflecting surface 1602, image transceiver 1604 and beam pattern 1606. In examples, transducer 136 may be an axial symmetric disk-shaped device that has dominant sensitivity along a direction perpendicular to its surface. Hence, an acoustic wave, which may travel along beam pattern 1606, with an oblique incident angle 1800 may result in lower signal amplitude detected by transducer 136. The angular factor is the ratio between the signal amplitude with oblique incident angle 1800 to the one with normal incident angle. FIG. 19 shows a curve that is the cosine of oblique incident angle 1800.

Figure 21:
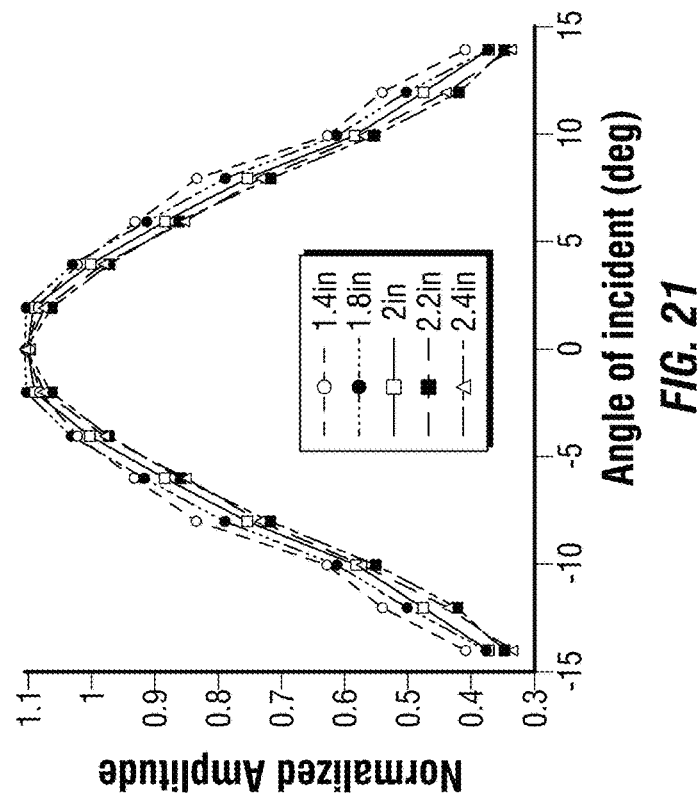
FIG. 21 is a graph of a normalized amplitude of a transducer.
Figure 20:
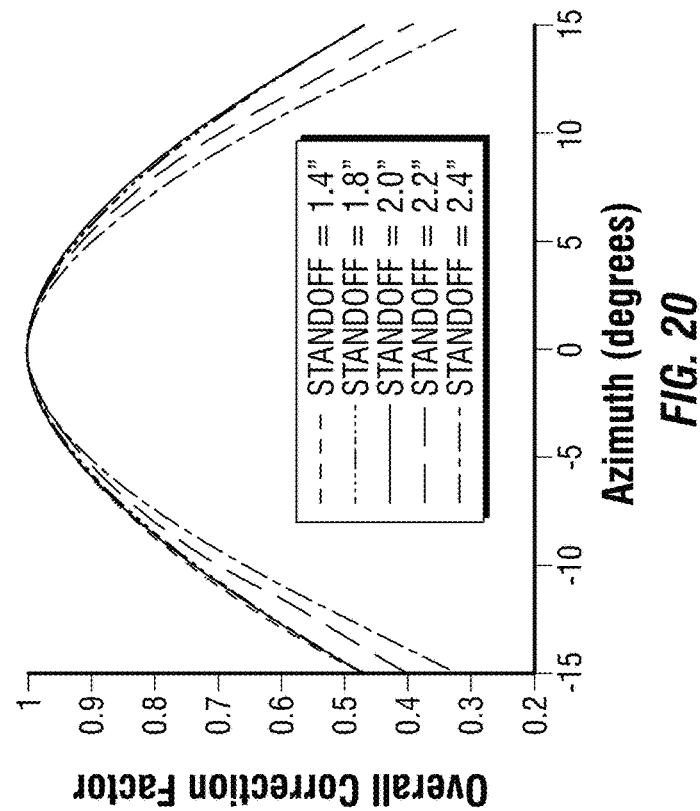
FIG. 20 is a graph of overall correction factor.

As discussed above, the eccentricity correction factor is computed by dividing beam pattern factor and angle factor for each pixel. The correction factor may be validated with experimental results, as shown in FIGS. 20 and 21. FIG. 20 illustrates a graph of the overall correction faction in view degrees and FIG. 21 illustrates a graph of a normalized amplitude in view of an angle of incident in degrees.

Figure 22:
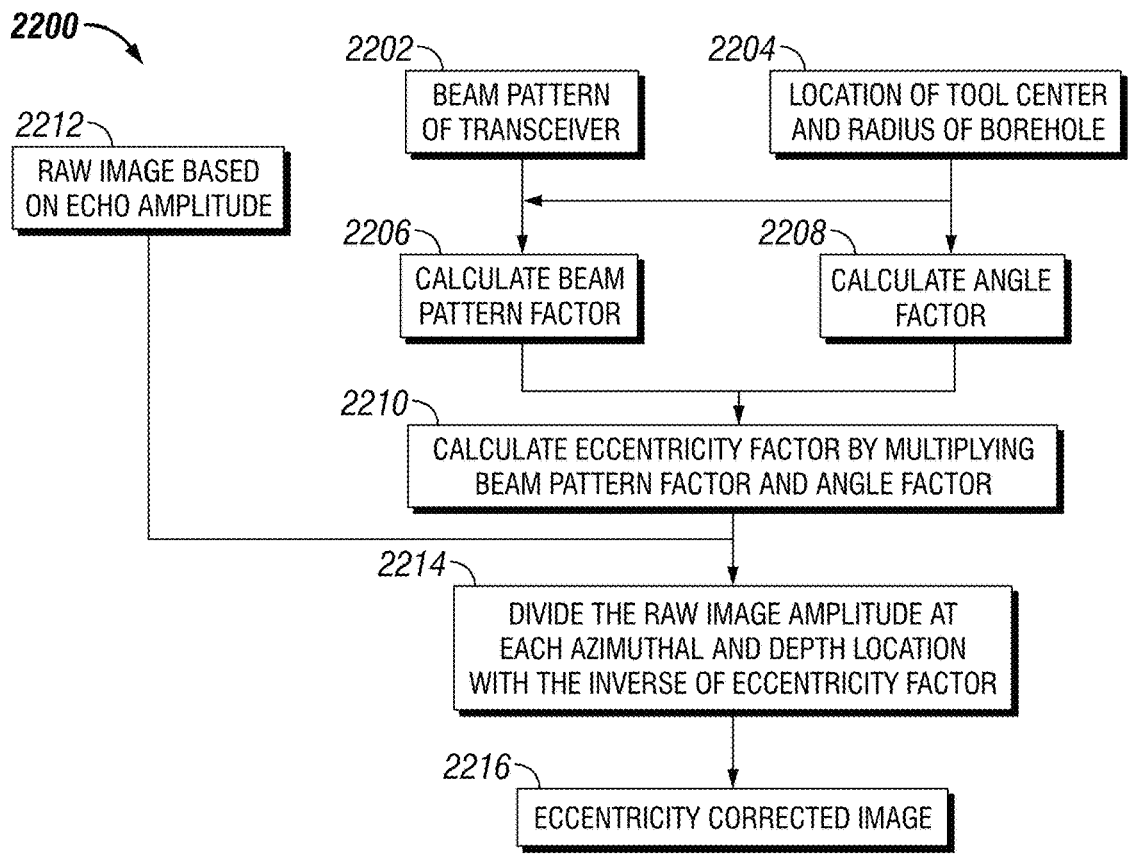
FIG. 22 is a flowchart for eccentricity correction.

FIG. 22 illustrates workflow 2200 for eccentricity correction. Workflow 2200 may begin with block 2202 in which a beam pattern of transducer 136 (e.g., referring to FIGS. 16 and 18) may be identified. Identifying the beam pattern of transducer 136 is discussed above in regard to FIGS. 16-21. In block 2204, the location of center 502 of measurement assembly 134 and the radius of borehole 500 (e.g., referring to FIG. 5) may be found. Center 502 and radius of borehole 500 may be found as discussed above in regard to FIG. 5. In block 2206 the beam pattern factor may be calculated as discussed above in FIG. 16-21. In block 2208, the angle factor may be calculated as discussed above in FIGS. 16-21. In block 2210, an eccentricity factor may be calculated by multiplying the beam pattern factor and the angle factor from blocks 2206 and 2208, respectively. In block 2212 a raw image may be produced from downhole logging measurements, described above, which may be based on echo amplitude 1502 (e.g., referring to FIG. 15). The raw image form block 2212 and the calculated eccentricity factor from block 2210 may be combined in block 2214. In block 2214, the raw image from block 2212 may be divided at each azimuthal and depth location with the inverse of the eccentricity factor from block 2210. In block 2216 the eccentricity corrected image may be formed.

Figure 23A:
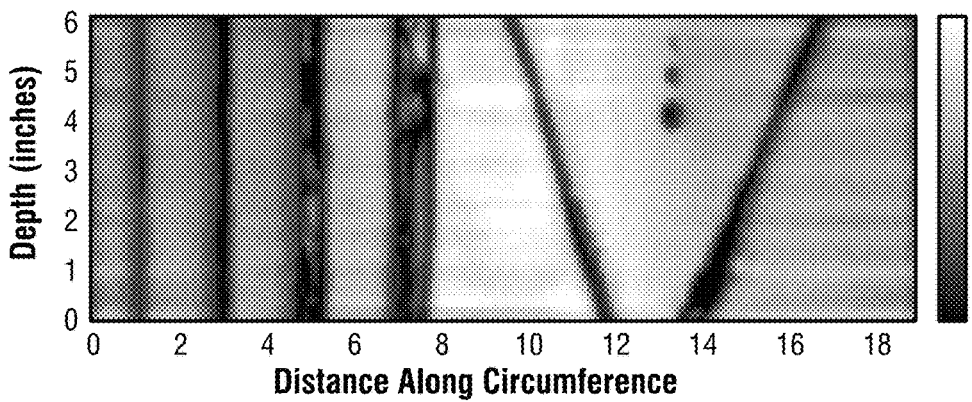
FIG. 23A is an ultrasonic image before eccentricity correction.
Figure 23B:
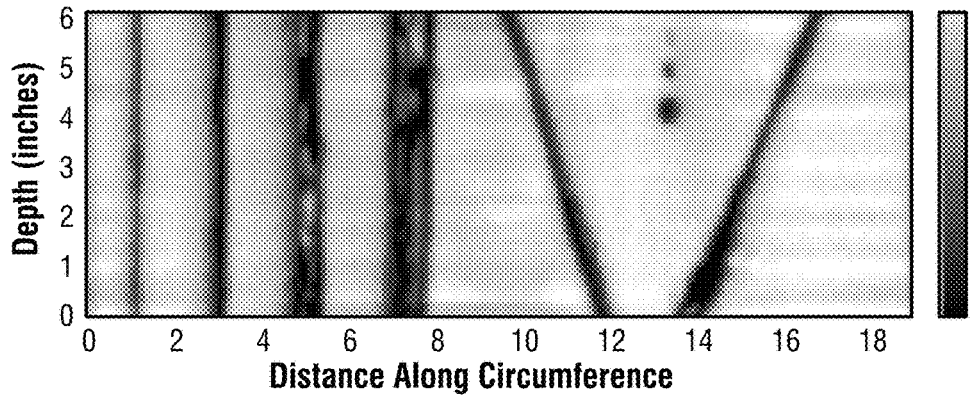
FIG. 23B is the ultrasonic image after eccentricity correction.

FIGS. 23A and 23B show an image from a test replicating a wellbore 102 (e.g., referring to FIG. 1 or 2) filled with water. The test may be applicable for any diameter wellbore 102. In the test, wellbore 102 is cased in a concrete lining and engraved with slots and holes. Measurement assembly 134 (referring to FIG. 5) is off-centered by 0.2 inch and rotating but not translating while the data is collected. FIG. 23A shows the image before correction, which shows an uneven background. In FIG. 23B, after correcting for eccentricity, the corrected image shows even background.

Another issue of eccentricity is attenuation of an acoustic wave in borehole fluid. For example, energy of acoustic waves dissipates while propagating in viscous borehole fluid. Thus, the amplitude of an image is lower when transducer 136 is further from wellbore 102 (e.g., referring to FIG. 5). The attenuation may be significant in heavy mud from geometrical spreading effects, mud attenuation effect, and/or angle of incidence effects. Utilizing the methods in flowchart 2200, described above, attenuation may be accounted for and corrected to produce an eccentricity corrected image. In examples, the attenuation factor may be considered as the ratio between wave amplitude in a non-dissipative medium for any given transceiver and mud type.

Figure 25:
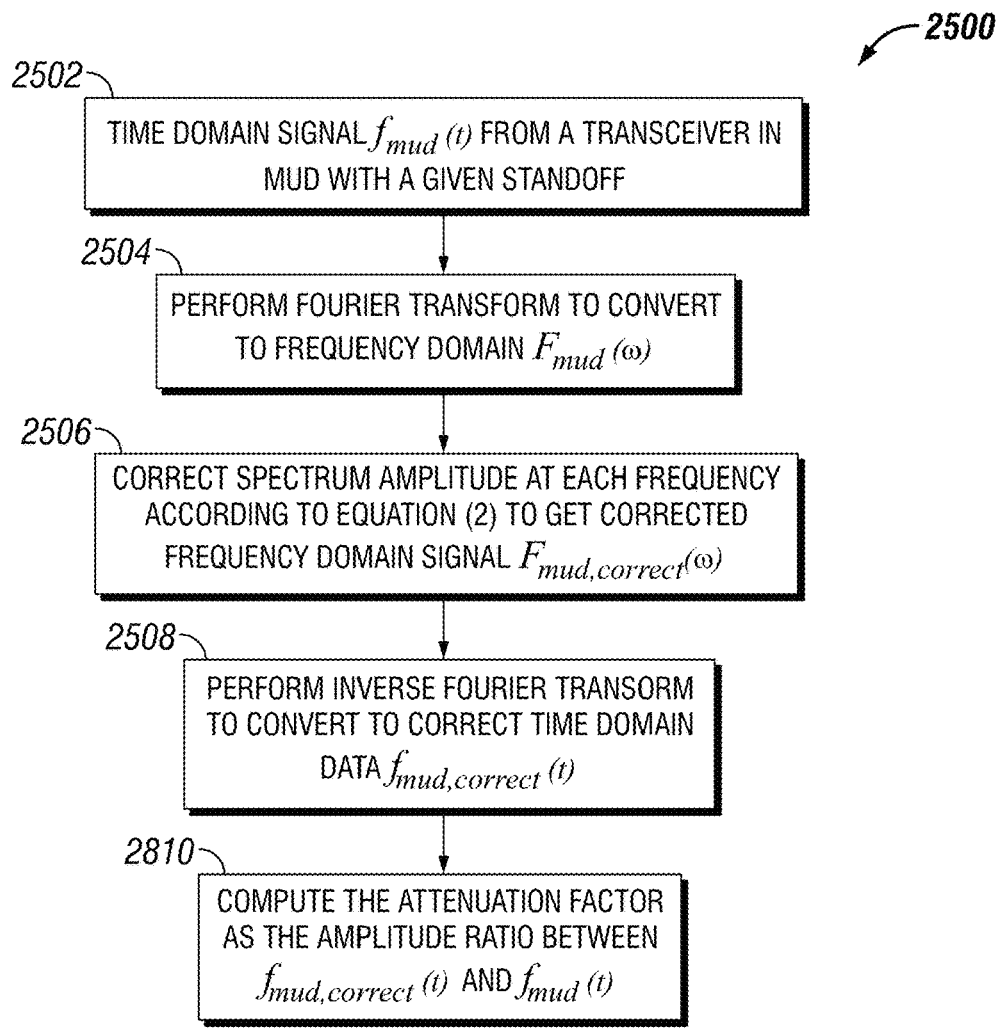
FIG. 25 is a flowchart for computing an attenuation correction factor.

FIG. 25 shows a flowchart 2500 for computing an attenuation factor for a transceiver signal with a given mud type and standoff. As shown, flowchart 2500 may begin with block 2502. In block 2502, a time domain signal $f_{mud}(t)$ from a transducer 136 in mud with a given standoff is determined. In block 2504, a Fourier transform is performed on the time domain signal from block 2502 to convert to frequency domain $f_{mud}(\omega)$. In block 2506, an operation may be performed to correct spectrum amplitude at each frequency according to Equation (3) to get corrected frequency domain signal $f_{mud,corrrect}(\omega)$ In block 2508, an inverse Fourier transform may be performed on the corrected spectrum amplitude from block 2506 to convert to corrected timed domain data $f_{mud,corrrect}(t)$ In block 2510, the attenuation factor is computed as the amplitude ratio between $f_{mud,corrrect}(t)$ and $f_{mud}(t)$.

Figure 26:
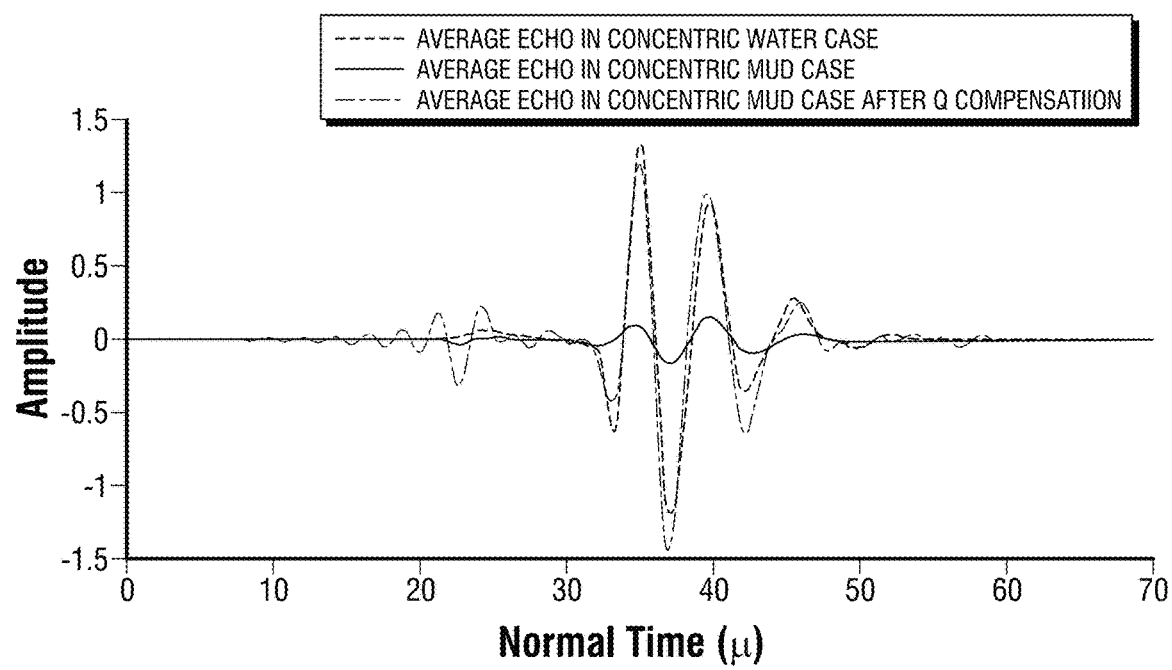
FIG. 26 is a graph of an echo signal in water, oil-based mud, and a compensated echo signal.

FIG. 26 shows the acoustic wave received by a transducer 136 (e.g., referring to FIG. 1) in two different fluid, water and mud with the same standoff. Using flowchart 2500, as described above, the acoustic wave measured in mud may be compensated by dividing the attenuation factor to obtain the corrected wave. The amplitude of the corrected wave and wave from water may be similar.

Figure 27A:
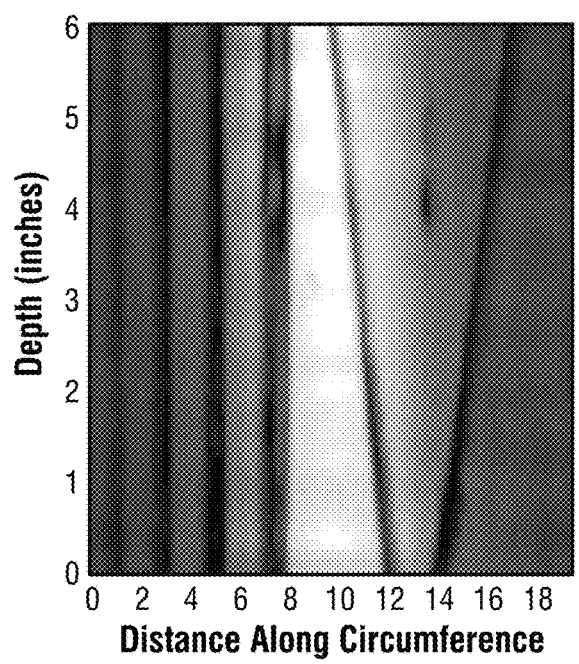
FIG. 27A is an ultrasonic image before eccentricity and attenuation correction.
Figure 27B:
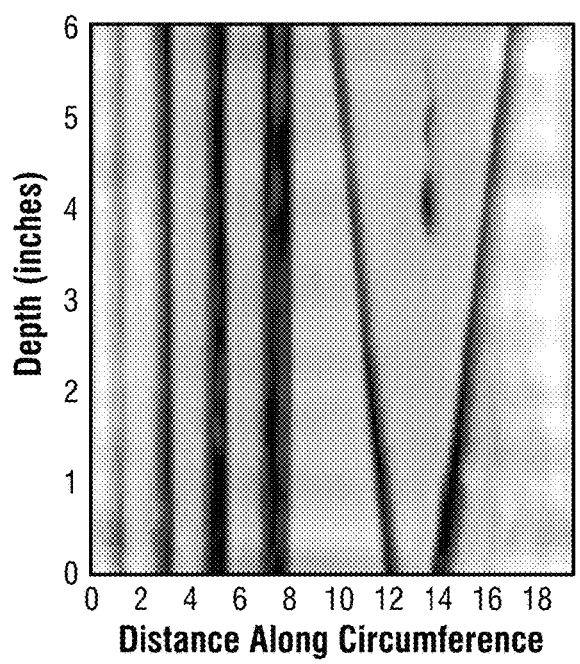
FIG. 27B is an ultrasonic image after eccentricity and attenuation correction.

As discussed above, the overall correction factor is calculated by the attenuation factor multiplied by the eccentricity factor. FIGS. 27A and 27B show an image obtained in a 3-inch-diameter borehole filled with mud before and after correction, respectively. The borehole is casted from concrete and engraved with slots and holes. Measurement assembly 134 (e.g., referring to FIG. 5) is off-centered by 0.2 inch. As shown in FIG. 27A, the image before correction shows uneven background and the less distinct features. After correcting for both attenuation and eccentricity, as shown in FIG. 27 B, the corrected image shows even background and distinct features.

The methods and systems discussed above are improvements over current imaging technology. In examples, the methods and systems correct the amplitude image by incorporating the tool-eccentricity related factors and medium attenuation factor. While, an amplitude of image may be measured in alternative ways such as taking deconvolution and cross-correlation between the signal and a standard wavelet, the methods described above may be used for an ultrasonic imager, and/or ultrasonic caliper for both wireline and LWD applications

[Claims Bank]

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for eccentricity correction comprising:
   disposing a downhole tool into a borehole, wherein the downhole tool comprises a measuring assembly having at least one transducer;
   determining a beam pattern and a beam pattern factor from the at least one transducer;
   determining a center of the measurement assembly in the borehole with the beam pattern;
   calculating an angle factor with at least a radius of the borehole;
   calculating an eccentricity factor with at least the beam pattern factor and the angle factor; and
   creating an eccentricity corrected image based at least on the eccentricity factor.

2. The method of claim 1, further comprising multiplying the beam pattern factor and the angle factor to calculate the eccentricity factor.

3. The method of claim 2, further comprising determining an echo amplitude from the beam pattern.

4. The method of claim 3, further comprising producing a raw image from the beam pattern and the echo amplitude.

5. The method of claim 4, further comprising dividing an amplitude of the raw image at one or more azimuthal and depth locations with an inverse of the eccentricity factor.

6. The method of claim 5, further comprising determining an attenuation correction factor.

7. The method of claim 6, further comprising dividing the attenuation correction factor to obtain a corrected wave.

8. The method of claim 6, further comprising:
   identifying a time domain signal from the transducer;
   converting the time domain signal to a frequency domain;
   correcting a spectrum amplitude at one or more frequencies to form a corrected frequency domain signal;
   converting the corrected frequency domain signal to a corrected time domain data; and
   computing an attenuation factor.

9. The method of claim 8, wherein the attenuation factor is an amplitude ration between the corrected time domain data and the time domain signal.

10. The method of claim 1, wherein determining a center of the measurement assembly comprises calculating an incident angle, a normal direction, and a standoff.

11. A system comprising:
    a downhole tool, wherein the downhole tool comprises:
    a measuring assembly, wherein the measuring assembly comprises at least one transducer and wherein the at least one transducer is configured to emit a pressure pulse and record an echo; and
    an information handling system configured to:
    determine a beam pattern and a beam pattern factor from the echo;
    determine a center of the measurement assembly in a borehole with the beam pattern;
    calculate an angle factor with at least a radius of the borehole;
    calculate an eccentricity factor with at least the angle factor and the beam pattern factor; and
    create an eccentricity corrected image based at least on the eccentricity factor.

12. The system of claim 11, wherein the information handling system is further configured to multiply the beam pattern factor and the angle factor to calculate the eccentricity factor.

13. The system of claim 12, wherein the information handling system is further configured to determine an echo amplitude from the beam pattern.

14. The system of claim 13, wherein the information handling system is further configured to produce a raw image from the beam pattern and the echo amplitude.

15. The system of claim 14, wherein the information handling system is further configured to divide an amplitude of the raw image at one or more azimuthal and depth locations with an inverse of the eccentricity factor.

16. The system of claim 15, wherein the information handling system is further configured to determine an attenuation correction factor.

17. The system of claim 16, wherein the information handling system is further configured to divide the attenuation correction factor to obtain a corrected wave.

18. The system of claim 16, wherein the information handling system is further configured to:
    identify a time domain signal from the transducer;
    convert the time domain signal to a frequency domain;
    correct a spectrum amplitude at one or more frequencies to form a corrected frequency domain signal;
    convert the corrected frequency domain signal to a corrected time domain data; and
    compute an attenuation factor.

19. The system of claim 18, wherein the attenuation factor is an amplitude ration between the corrected time domain data and the time domain signal.

20. The system of claim 11, wherein determining a center of the measurement assembly comprises calculating an incident angle, a normal direction, and a standoff.

* * * * *